July 26, 1966     K. GUTWEILER ETAL     3,263,006

PROCESS FOR GRANULATING SUBSTANCES FROM THE MELT

Filed July 31, 1962

INVENTORS.
KLEMENS GUTWEILER
FRIEDRICH WUNDER
WILHELM RIEMENSCHNEIDER

BY Curtis, Morris, & Safford

ATTORNEYS

United States Patent Office 3,263,006
Patented July 26, 1966

3,263,006
PROCESS FOR GRANULATING SUBSTANCES FROM THE MELT
Klemens Gutweiler, Mainz (Rhine), and Friedrich Wunder and Wilhelm Riemenschneider, Frankfurt am Main, Germany, assignors to Farbwerke Hoechst Aktiengesellschaft vormals Meister Lucius & Bruning, Frankfurt am Main, Germany, a corporation of Germany
Filed July 31, 1962, Ser. No. 213,782
Claims priority, application Germany, Aug. 5, 1961, F 34,617
13 Claims. (Cl. 264—8)

Substances forming plastic crystals and having a high vapor pressure, such as camphor, or having a low melting point, for exampe maleic anhydride, are difficult to granulate according to the usual methods, since in machines operating with great force, such as crushing rolls, the particles weld together and agglomerate. In high speed machines, such as hammer mills or disk attrition mills, relatively large amounts of cooling gas are passed through the machine causing considerable losses by evaporation on account of the high vapor pressure of the substance to be granulated. Furthermore, in all these machines contamination of the substance to be granulated can hardly be avoided, for example by lubricants or substances originating from the atmosphere.

It has now been found that substances can be granulated from the melt by allowing the molten mass to solidify in a container having elastically moldable walls, while the melt and the walls of the container are kept in continuous motion.

Substances which can be granulated by the process of the invention, shall not have too high a melting point (approximately below 250° C.) and they must not tend to form supercooled melts.

The process of the invention can be applied with special advantage to substances having a high vapor pressure, since evaporation losses can be avoided, and to substances having plastically soft crystals, for example camphor, since an agglomeration of the individual crystals is avoided.

The process of the invention is especially advantageous for granulating, for example, maleic anhydride, camphor, camphane, camphene, phthalic anhydride, naphthalene, dichloronaphthalene, fluorene, cumarin, menthol trioxane and p-dichlorobenzene.

As materials for the container having elastically moldable walls there can be used rubbers or plastic materials the softening or melting point of which is sufficiently above the temperature of the melt to be granulated, i.e. at least about 10° C. above that temperature. Materials of this kind are, for example, polyolefins such as polyethylene, polypropylene, polybutylene, mixtures thereof or copolymers of the corresponding monomers; polyhalogeno-olefins, such as polytetrafluorethylene, polytrifluorochlorethylene; polyesters such as polyethylene glycol terephthalate; polyamides such as polyamides prepared on the basis of ε-caprolactam; plastics on the basis of homo- or copolymers of acrylonitrile or of a methacrylic acid ester; and plastics on the basis of cellulose. It is especially advantageous to use a material that is not wetted by the melt of the substance to be granulated.

If desired, the wall material can be reinforced, for example by glass fibers.

The granulation is preferably carried out at atmospheric pressure, but it is likewise possible to operate under elevated or reduced pressure. When selecting the wall material it must be taken into consideration that the atmospheric melting point of the substance to be granulated is displaced somewhat by changes in pressure.

In the simplest case, the process of the invention is carried out in a manner such that the molten substance is put into a bag of a suitable plastic material and allowed to solidify while the bag is kneaded. Small crystals are formed which can neither deposit on the wall nor agglomerate on account of the motion, so that the substance is obtained at the end of the operation as a freely flowing powder.

The granulation is suitably carried out in a container which rotates around a horizontal axis or a slightly inclined axis, for example a rotary drum, of any desired rigid material (for example wood, metal or cardboard). In the container is arranged a bag of a suitable elastic material which is a little smaller than the container and up to one third of which is filled with the liquid substance to be granulated. The bag is subjected to a rotation together with the container.

An apparatus of this type has the further advantage that the granulation may be carried out with the exclusion of air in an atmosphere of a protective gas (for example nitrogen, carbon dioxide, hydrocarbon gases or noble gases). The substance solidifies in the bag to individual crystals which cannot agglomerate on account of their weight and the continuous motion, and cannot deposit on the walls of the container when the walls are not wetted by the substance. In this manner a flowable solid mass is obtained. By adjusting the cooling time and the number of revolutions, almost any desired grain size can be obtained. The speed of rotation of the container can vary within wide limits; it is preferably in the range of 2 to 100 revolutions per minute. The speed of rotation must be high enough that all agglomerating crystals are pulverized by the weight of the loose material, but it must not be so high that centrifugal forces occur which prevent the bag from falling down and inhibit the formation of granules.

For carrying out the granulation in continuous manner it is of advantage to use a tube which rotates around a horizontal axis or an axis deviating from the horizontal line by a small angle (up to 20° for example). In the tube a flexible hose of an electrically moldable material is arranged. The molten substance is continuously supplied at the upper end of the hose while the granules are continuously discharged at the lower end of the hose.

The apparatus is illustrated schematically in the accompanying drawing wherein.

Figure 1:
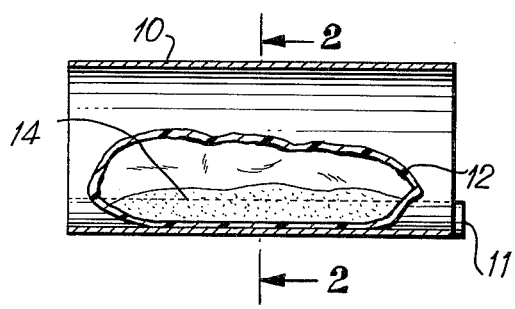
FIGURE 1 is a view in elevation showing one embodiment.
Figure 2:
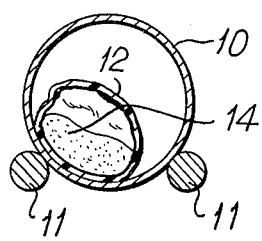
FIGURE 2 is an end view taken on section line 2—2 of FIGURE 1.

In the embodiment illustrated schematically in FIGURES 1 and 2, a tubular member 10 rotated on its axis by any suitable means such as rollers 11 is provided with a bag or the like 12 of yieldable material for containing a substance 14 that is initially molten and allowed to solidify while the tubular member 10 is rotated and the contents are thereby kneaded.

Figure 3:
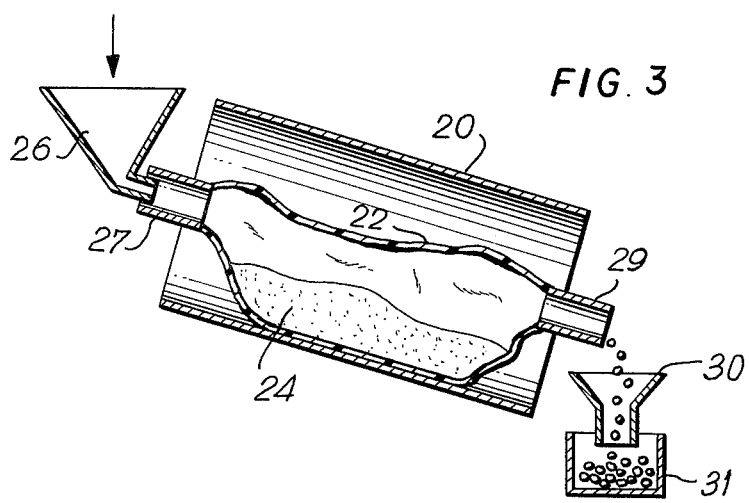
FIGURE 3 is a schematic view in elevation of another embodiment.

Referring now to FIGURE 3 of the drawing, a tubular member 20 positioned at an angle to the horizontal is shown mounted for rotation containing a bag or the like 22 communicating at one end with means for supplying a molten substance 24 to the bag, said means including a funnel member 26 and an axial member 27 and at the other end with a device for discharging the granulated substance from the granulating zone within the tubular member 20, said device including an axial member 29 and a funnel 30 for depositing the granulated substance into a receiver 31.

As compared with known processes, the granulation process of the invention offers the advantage that smaller amounts of substance are lost by evaporation or separation on the wall of the container or apparatus. Moreover, the granulated substance contains smaller amounts of impurities.

The process of the invention is especially suitable for granulating polymerization-pure trioxane. It is known to granulate trioxane in the solid state on a roller dryer, in a mixer, in a disk attrition, or in crushing rolls. However, in all known processes small amounts of impurities are introduced (5 p.p.m. of oxygen, for example, interfere with the polymerization), or more or less large amounts of trioxane are lost in the granulating machines in the form of vapor or deposits. When, for example, trioxane is passed once through a disk attrition mill only 75% of the trioxane used is recovered, the remainder having evaporated and escaped. Still further, when apparatus having metal surfaces are used, all oxidizing substances and above all atmospheric oxygen must be carefully excluded, since otherwise peroxides would form under the catalytic action of the metal, whereby the thermostability of the polymerized product is largely reduced. For the reasons set forth above trioxane could be granulated on an industrial scale only with the use of amines as stabilizers. Amines are, however, pronounced inhibitors for catalysts and are difficult to remove. Trioxane which has been granulated with the use of larger amounts of amines is, therefore, not suitable for polymerization.

Trioxane which has been granulated by the process of the invention is distinguished by a remarkably low content of impurities and it contains but a very small proportion of open-chain polyoxymethylenes. It is capable of being stored whereas any other method of solidification renders trioxane unsuitable for polymerization and liquid trioxane can only be stored for several hours, after that time the polymers made therefrom being useless on account of too low a thermostability.

The following examples serve to illustrate the invention but they are not intended to limit it thereto.

*Example 1*

A cylindrical container having a capacity of 30 liters and capable of being rotated around a horizontal axis contained a strong closed polypropylene bag having a capacity of 10 liters. 4 kilograms of molten trioxane were placed in the bag, i.e. about one third of the bag volume was filled with trioxane. The bag must not contain a larger amount of trioxane since the volume of trioxane increases considerably during granulation. The container rotated around its axis at a moderate speed (60 revolutions per minute). After 4 hours the granulation was terminated. 4 kilograms of granulated trioxane were obtained in the form of individual crystals having a size of 1 to 3 mm. which had the same polymerization properties as the starting trioxane. When stored for 6 months at room temperature the properties of the granulated trioxane did not change.

Instead of a polypropylene bag there can also be used a bag of polyethylene if the temperature of the liquid trioxane is sufficiently low, for example in the range of 70 to 80° C., so that the polyethylene does not melt and tear open.

*Example 2*

Molten trioxane was continuously granulated in a tube rotating around its axis and lined with a thin-walled polyethylene tube. The polyethylene tube was fastened in some places to the rotating tube and had a slight inclination. At the upper end liquid trioxane was supplied at a temperature of 70° C. and granulated trioxane was continuously discharged at the lower end. The tube and the supply and discharge devices were kept under a protective nitrogen atmosphere containing less than 5 p.p.m. of oxygen. Practically all of the trioxane supplied was obtained in the form of granules as described in Example 1.

*Example 3*

3 kilograms of camphor were melted at 200° C. and filled into a bag, having a capacity of about 10 liters, of pure polyamide (melting point about 220° C.) the wall of which was 0.2 mm. thick. The bag was tied up and placed in a horizontal, closed rotary drum made of cardboard and having a capacity of 30 liters. The drum rotated at a speed of about 100 revolutions per minute. The camphor solidified in the course of 3 hours. The rotary drum must be preheated and externally insulated since otherwise the camphor solidifies too rapidly. 3 kilograms of granulated camphor were obtained, the grains of which had a diameter of 0.5 mm. on the average.

*Example 4*

3 kilograms of maleic anhydride were melted at 70–80° C. and filled into a bag of polyethylene (capacity about 10 liters, wall thickness 0.3 mm.). The bag was placed in a tin drum having a capacity of 30 liters and being open at one side. The drum rotated in horizontal position (about 60 revolutions per minute) with a slight upward inclination (about 10°). The substance was allowed to solidify in the course of 6 hours. 3 kilograms of maleic anhydride were obtained having an average grain size of 0.5 to 1 mm.

*Example 5*

5 kilograms of phthalic anhydride were melted at 150° C. and filled into a polyamide bag (capacity about 15 liters, wall thickness 0.2 mm.). The bag was placed in a rotary drum having a horizontal axis and the phthalic anhydride was allowed to solidify at 60 revolutions per minute. 5 kilograms of granules were obtained having a diameter of about 1–2 mm.

*Example 6*

Molten maleic anhydride was continuously granulated in a tube having a diameter of 20 cm. and lined with a loosely attached polyethylene tube having a somewhat smaller diameter. The tube rotated at a speed of 100 revolutions per minute and had a slight inclination. At the upper end liquid maleic anhydride was continuously supplied and at the lower end the granules were discharged. In order to obtain a very pure product the tube was operated under a nitrogen atmosphere.

*Example 7*

3 kilograms of naphthalene were melted at 95° C. and the liquid melt was placed in a polyamide bag (wall thickness 0.2 mm., capacity about 10 liters). The melt was allowed to solidify while being kept in continuous motion. Granules were obtained having a medium size of 1 mm.

*Example 8*

3 kilograms of p-dichlorobenzene were heated at 70° C. and the melt was placed in a polyethylene bag having a wall thickness of 0.3 mm. The bag was given into a rotary drum made of cardboard and rotating about 60 times per minute. The melt was allowed to solidify. Granules were obtained having a diameter of 1 to 2 mm.

We claim:

1. A process for preparing solid granular particles of an organic substance which does not tend to form supercooled melts from a melt of said substance which comprises restraining said melt in a granulating zone having flexible walls, said granulating zone having a greater volume than the volume of said melt, cooling gradually the melt, and flexing continuously the walls of said granulating zone while cooling to provide a relative motion between said walls and the melt being cooled to form said granular particles.

2. A process as defined in claim 1 wherein said granulating zone is generally cylindrical in shape and which further comprises rotating said granulating zone about its longitudinal axis.

3. A process as defined in claim 2 wherein said longitudinal axis about which said granulating zone is rotated is at an angle of about 20° from horizontal.

4. A process as defined in claim 1 wherein said melt is continuously charged to said granulating zone and solid granular particles are continuously discharged from said zone.

5. A process as defined in claim 4 wherein said melt is charged to said granulating zone at a higher elevation than the elevation at which said granulated particles are discharged from said zone.

6. A process as defined in claim 1 wherein said granulation is conducted under a protective atmosphere of a gas inert toward the substance of said melt.

7. A process as defined in claim 1 wherein said flexible walls of said granulating zone are made of a material selected from the group consisting of polyolefins, polyhaloolefins, polyesters, polyamides, polymeric materials based on acrylonitrile, polymeric materials based on methacrylic acid ester and plastic materials based on cellulose.

8. A process as defined in claim 1 wherein said organic substance has a melting point below about 250° C.

9. A process as defined in claim 1 wherein the melting point of said flexible walls is at least about 10° C. above the melting temperature of the substance in the melt.

10. A process as defined in claim 1 wherein said organic substance has a high vapor pressure.

11. A process as defined in claim 1 wherein said granulating zone is in the form of a bag in which the melt is restrained.

12. A process for preparing solid granular particles of an organic substance selected from the group consisting of maleic anhydride, phthalic anhydride, camphor, camphane, camphene, naphthalene, dichloronaphthalene, fluorene, cumarin, menthol, trioxane and p-dichlorobenzene from a melt of said organic substance which comprises restraining said melt in a granulating zone having flexible walls, said granulating zone having a larger volume than the volume of said melt to be granulated, cooling gradually the melt within said granulating zone, and flexing continuously the walls of said granulating zone while cooling to provide a relative motion between said walls and the melt being cooled to form said granular particles.

13. A process as defined in claim 12 wherein said organic substance is trioxane.

References Cited by the Examiner
UNITED STATES PATENTS

| | | | |
|---|---|---|---|
| 2,464,187 | 3/1949 | Seaton | 264—8 |
| 2,728,107 | 12/1955 | Hershey | 264—8 |
| 2,934,787 | 5/1960 | Hershey et al. | 264—8 |
| 2,984,863 | 5/1961 | Mullen | 18—2.4 |
| 3,016,566 | 1/1962 | Hoy et al. | 18—2.4 |
| 3,030,081 | 4/1962 | Wilson et al. | 259—72 |

ROBERT F. WHITE, *Primary Examiner.*

ALEXANDER H. BRODMERKEL, *Examiner.*

M. H. ROSEN, A. R. NOE, *Assistant Examiners.*